United States Patent [19]

Aratani

[11] Patent Number: 4,882,231
[45] Date of Patent: Nov. 21, 1989

[54] MAGNETO-OPTICAL RECORDING MEDIUM

[75] Inventor: Katsuhisa Aratani, Chiba, Japan

[73] Assignee: Sony Corporation, Tokyo, Japan

[21] Appl. No.: 278,022

[22] Filed: Nov. 30, 1988

[30] Foreign Application Priority Data

Dec. 4, 1987 [JP] Japan ................... 62-307070

[51] Int. Cl.$^4$ ............ G11B 5/66; G11B 7/24
[52] U.S. Cl. ................. 428/611; 428/615; 428/678; 428/686; 428/928
[58] Field of Search ........... 428/611, 622, 678, 668, 428/928, 681, 627, 632, 615, 686; 365/122

[56] References Cited

U.S. PATENT DOCUMENTS

| | | | |
|---|---|---|---|
| 4,293,621 | 10/1981 | Toyami | 428/928 |
| 4,518,657 | 5/1985 | Yanagida | 428/928 |
| 4,556,291 | 12/1985 | Chen | 365/122 |
| 4,578,699 | 3/1986 | Sato et al. | 428/928 |
| 4,645,722 | 2/1984 | Katayama et al. | 428/928 |
| 4,670,356 | 6/1987 | Sato et al. | 428/928 |
| 4,753,853 | 6/1988 | Sato et al. | 428/681 |
| 4,777,082 | 10/1988 | Ishizaki et al. | 428/678 |
| 4,789,606 | 12/1988 | Yamada et al. | 428/928 |

FOREIGN PATENT DOCUMENTS 60-243840 12/1985 Japan ................. 365/122

Primary Examiner—John J. Zimmerman
Attorney, Agent, or Firm—Hill, Van Santen, Steadman & Simpson

[57] ABSTRACT

The magneto-optical recording medium is disclosed which has a laminous structure with a first magnetic film suited to provide a large rotation angle of the plane of polarization by magneto-optical interaction, a third magnetic film having a great coercive force, and a second magnetic film interposed therebetween to magnetically couple the first and third magnetic films at room temperature, wherein such magnetic coupling is substantially interrupted at a temperature in a recording operation.

Upon recording signal on the medium, a laser beam is irradiated to the medium and raises the temperature of the medium near Curie temperature Tc3 of the third magnetic film, thus direction of the magnetization is determined by the magnetic field applied to the irradiated portion.

Upon cooling the irradiated portion, the second magnetic film serves to magnetically couple the first and third magnetic film, the magnetization of the third film is transferred to the first film. Thus the required magnetic field for recording is greatly reduced, and high C/N can be obtained resulting in high density recording.

4 Claims, 4 Drawing Sheets

MAGNETO-OPTICAL RECORDING MEDIUM

BACKGROUND OF THE INVENTION

The present invention relates to a magneto-optical recording medium such as a magneto-optical disc where data bits are recorded in the form of magnetic domains by a magneto-optical (thermal) recording process, and the recorded data bits are read out in accordance with the Kerr rotation angle or Faraday rotation angle based on the rotation of the polarization plane of the data read light.

There are known magneto-optical recording media as disclosed in, for example, Japanese Patent Laid-open NO. 57 (1982)-78652, wherein a double layer structure is contrived for the purpose of accomplishing a high reproduction capability and a high recording sensitivity, with a first magnetic film having a high Curie point and a small coercive force to serve as a reproducing magnetic film, and a second magnetic film magnetically coupled thereto and having a low Curie point and a great coercive force.

In the magneto-optical recording medium of such a double layer structure, the layer used for recording or erasing data is the reproducing magnetic film (first magnetic film), and a recording or erasing operation is performed at a temperature below the Curie point thereof. Consequently the magnetization of the first magnetic film in the recording operation is relatively great, and therefore the stray magnetic field and demagnetizing field resulting therefrom are also great in intensity. Thus, in the recording or erasure, it becomes necessary to apply an external magnetic field having a sufficient intensity of, e.g. 500 (oe) for completely canceling such stray magnetic field and demagnetizing field. Accordingly, there exists a problem that the above recording medium is not suited for overwriting which writes new data over the previously recorded data, by using an external magnetic field modulated according to a signal to be recorded.

OBJECT AND SUMMARY OF THE INVENTION

Accordingly it is an object of the present invention to provide an improved magneto-optical recording medium in which external magnetic field required to record signal thereon is reduced.

It is another object of the present invention to provide a magneto-optical recording medium having high recording sensitivity and high C/N ratio.

According to the present invention, there is provided a magneto-optical recording medium comprises a first magnetic film, a second magnetic film and a third magnetic film superposed sequentially to form layers. The first magnetic film is adapted to achieve a larger rotation angle of the plane of polarization by magneto-optical interaction than the third magnetic film, wherein the respective Curie points Tc1, Tc2 and Tc3 of said first, second and third magnetic films are so selected as to have, at room temperature $T_{RT}$, the relationship of $Tc2 > T_{RT}$, $Tc2 < Tc1$, and $Tc2 < Tc3$. The second magnetic film magnetically coupled at the room temperature to the first and third magnetic films serves to interrupt, when heated in a recording operation, the magnetic coupling between the first and third magnetic films. Data is recorded on the third magnetic film at a temperature in the vicinity of the Curie point Tc3 of the third magnetic film, and in a subsequent cooling stage, the data recorded on the third magnetic film is transferred onto the first magnetic film coupled magnetically thereto through the second magnetic film.

DESCRIPTION OF THE PREFERRED EMBODIMENTS

Figure 1:
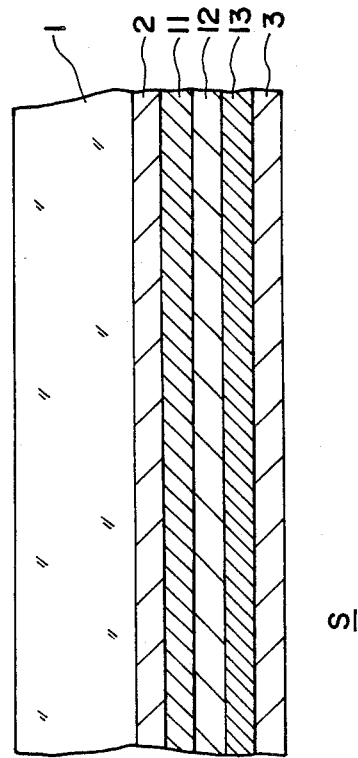
FIG. 1 schematically shows the structure of a magneto-optical recording medium according to the present invention.

In the present invention, as illustrated in FIG. 1, a dielectric film 2 serving as a protective film or interference film is formed, when neccesary, on a transparent substrate 1 composed of glass, acrylic resin, or polycarbonate resin, and there are deposited, on the dielectric film 2, sequential layers of a first magnetic film 11, a second magnetic film 12 and a third magnetic film 13, each having perpendicular magnetization.

The first magnetic film 11 is so composed as to achieve a wide rotation angle of the plane of polarization by magneto-optical interaction.

The respective Curie points Tc1, Tc2 and Tc3 of the first, second and third magnetic films have the following relationship, in which $T_{RT}$ denotes room temperature:

$$Tc2 > T_{RT} \tag{1}$$

$$Tc2 < Tc1, Tc2 < Tc3 \tag{2}$$

The second magnetic film 12, at the room temperature $T_{RT}$, serves to magnetically couple the first and third magnetic films 11 and 13 to each other, and when heated up to a temperature in a recording operation, interrupts the magnetic coupling between the first and third magnetic films 11 and 13. Practically, therefore, the second magnetic film 12 is so formed as to have a thickness ranging from 30 to 200Å, and in relation to the interface magnetic wall energy $\sigma w$ between the first magnetic film 11 and the third magnetic film 13, the magnetization Ms1, the coercive force Hc1 and the thickness h1 of the first magnetic film are so determined as to satisfy the following condition with an external magnetic field Hex applied, at any temperature above the room temperature $T_{RT}$ and below the Curie point Tc2 of the second magnetic film 12:

$$\sigma w > 2Ms1.h1.Hc1 + 2Ms1.h1.Hex \tag{3}$$

Thermal recording is performed on the third magnetic film 13 at a temperature in the vicinity of its Curie point Tc3, and in the subsequent cooling stage, the recorded data on the third magnetic film 11 coupled magnetically thereto through the second magnetic film 12.

Denoted by 3 is a protective film formed on the surface, and S represents the entirety of the magneto-optical recording medium according to the present invention.

A data recording (writing) operation on the above magneto-optical recording medium is performed in an ordinary manner that a scanning laser beam modulated by the data to be recorded is irradiated with application of an external recording magnetic field perpendicular to the film plane, and in a medium portion where data "1", for example, is to be recorded, the third magnetic film 13 is locally heated up to the vicinity of the Curie point Tc3 thereof. In this stage, the second magnetic film 12 is also heated above the Curie point Tc2 according to Eq. (2) and thereby interrupts the magnetic coupling between the first and third magnetic films 11 and 13. When the heated medium portion is cooled in a subsequent stage due to non-irradiation of the laser beam with its displacement therefrom, a data bit or data magnetic domain is formed by the action of the stray magnetic field and the external recording magnetic field, and upon fall of the temperature below the Curie point Tc2 of the second magnetic film 12 as a result of such cooling, the magnetic coupling between the first and third magnetic films 11 and 13 is resumed by the second magnetic film 12, whereby the relationship of Eq. (3) is regained to cause transfer of the recorded data, i.e. data magnetic domain from the third magnetic film 13 through the second magnetic film 12 to the first magnetic film 11. It follows that the data magnetic domain is formed on the first magnetic film 11 as well. In this manner, binary data "1" or "0" is written in accordance with the presence or absence of such magnetic domain.

According to the recording mode mentioned, initially the third magnetic film 13 is recorded. Although the Curie point Tc3 of the third magnetic film 13 is higher than the Curie point Tc2 of the second magnetic film 12, the former is settable to a low temperature, and a recording operation can be performed in the vicinity of such low Curie point Tc3 where the saturation magnetization is sufficiently small, so that the stray magnetic field and the demagnetizing field resulting therefrom are also rendered small to consequently enable recording with a small amount of energy. Therefore, the intensity of the external magnetic field required in the recording or erasing operation is reducible to a fraction of the value known in the conventional art. And thus overwriting by use of magnetic field modulated according to signal to be recorded becomes possible due to such decrease of the required external magnetic field intensity in the recording or erasing (overwriting) operation.

In reading out the data from the magneto-optical recording medium S where the first magnetic film 11 is composed of a selected material for providing a wide rotation angle, e.g. Kerr rotation angle $\theta k$, of the plane of polarization by the magneto-optical interaction, the first magnetic film 11 serves as a reproducing film to enhance the reproduction output, hence attaining dimensional reduction of the data bit length to consequently accomplish a high recording density.

A dielectric film 2 serving as a protective film or interference film, first to third magnetic films 11 to 13 capable of satisfying the conditions of Eqs. (1) to (3), and a protective film 3 are sequentially formed on a transparent substrate 1 by the technique of continuous evaporation, sputtering or the like performed by, for example, a magnetron sputtering apparatus.

The first magnetic film 11 may be composed of GdFeCo, TbFeCo, GdTbFeCo or the like adapted to provide a large Kerr rotation angle $\theta k$.

The third magnetic film 13 may be composed of TbFe, GdTbFe, DyFeCo or the like which has a great coercive force and the lowest practicable Curie point Tc3 under the condition of Eq. (2) and is in a rare-earth magnetization dominant state at the room temperature $T_{RT}$.

And the second magnetic film 12 may be composed of TbFeCoCr or the like in a thickness ranging from 30 to 200Å.

Example

On a glass plate, there are provided track grooves at a pitch of 1.6 μm. And there are deposited, on such substrate 1, sequential layers of a 700Å-thick dielectric film 2 composed of $Si_3N_4$, a 250Å-thick first magnetic film 11 of GdFeCo, an 80Å-thick second magnetic film 12 of TbFeCoCr, a 500Å-thick third magnetic film 13 of TbFeCoCr and a protective film 3 of $Si_3N_4$ by the technique of continuous sputtering carried out by a magnetron sputtering apparatus to produce a magneto-optical recording medium, i.e. optical disc S.

Table 1 lists below the respective thicknesses and magnetic characteristics of such magnetic films 11 to 13 as individual layers.

In Table 1, "FeCo rich" implies a film where the FeCo sublattice magnetization is dominant at the room temperature, and "Tb rich" implies a film where the Tb sublattice magnetization is dominant at the room temperature.

TABLE 1

|  | Material | Thickness (Å) | Curie point (°C.) | Coercive force (KOe) |
| --- | --- | --- | --- | --- |
| Magnetic film 11 | GdFeCo | 250 | >250 | 0.3 (FeCo rich) |
| Magnetic film 12 | TbFeCoCr | 80 | 130 | 2 (Tb rich) |
| Magnetic film 13 | TbFeCoCr | 500 | 153 | 15.3 (FeCo rich) |

Figure 2:
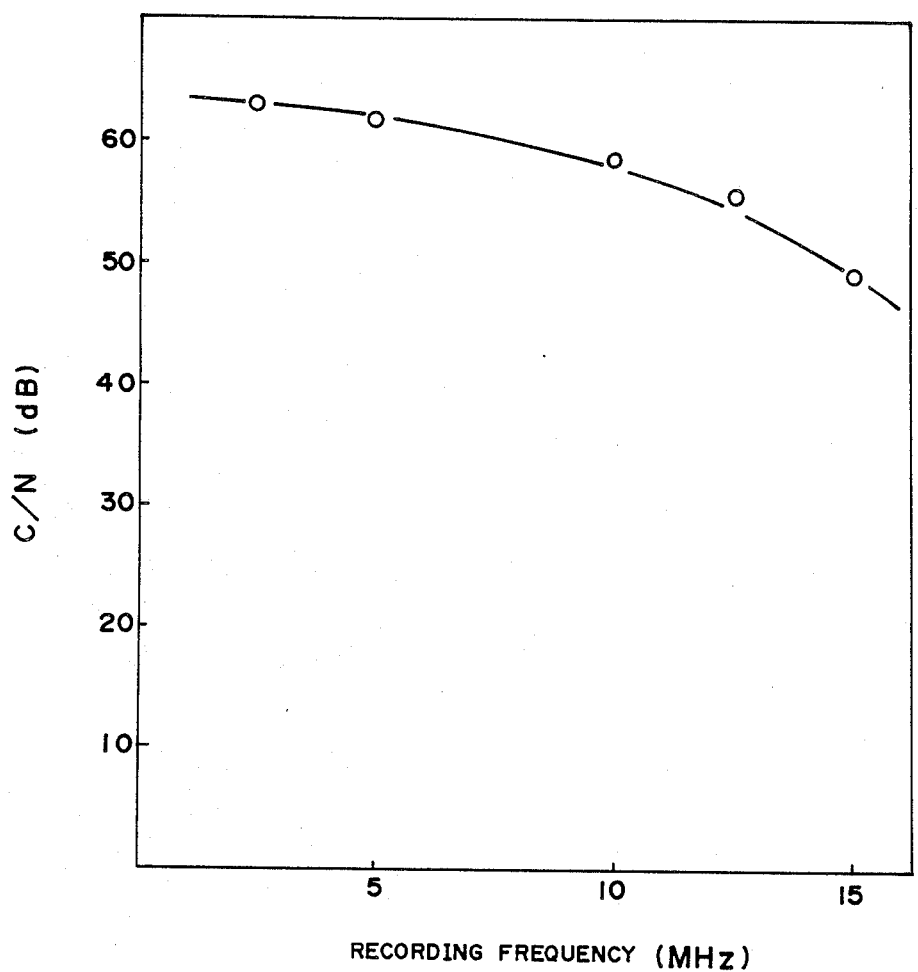
FIG. 2 graphically shows the C/N characteristic curve measured in the recording medium of FIG. 1.

FIG. 2 graphically shows the results of measuring the dependency of the carrier level-to-noise level (C/N) on the recording frequency in the magneto-optical recording medium S of the example. In this experiment, the dependency of the C/N on the recording frequency was measured under the conditions including a disc linear velocity of 20 m/sec, an erasing magnetic field intensity of −100 (Oe), a recording magnetic field intensity of 100 (Oe), an erasing power of 8.4 mW, and a recording power of 10 mW.

An understood from FIG. 2, the magneto-optical recording medium of the present invention provides C/N larger than 50 dB up to 14 MHz, even the external magnetic field was reduced to 100 Oe which is much smaller value used in the prior art.

Figures 3A, 3B:
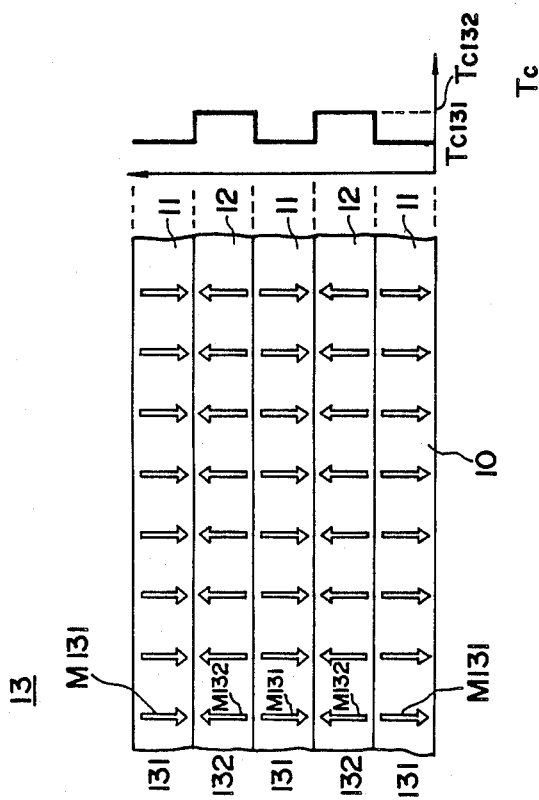
FIG. 3A illustrates the structure of a third magnetic film.
FIG. 3B shows Curie temperature of each layer.
Figures 4A, 4B:
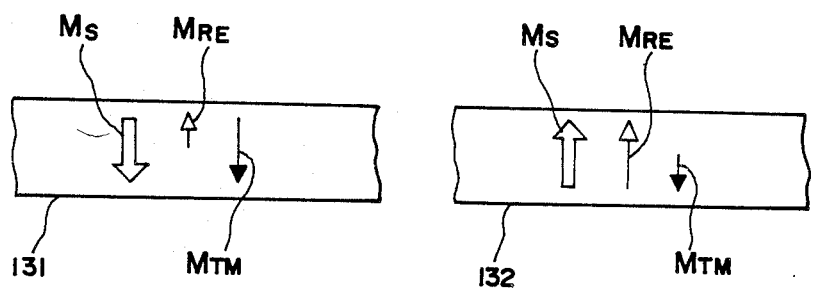
FIGS. 4a and 4B illustrate the relationship between saturation magnetizations and sublattice magnetizations in a magnetic alloy of rare-earth and transition metals.

Although the third magnetic film 13 may be formed into a single-layer structure as mentioned above, the stray magnetic field in the magnetic film 13 can be minimized or diminished to zero by forming it into a double or more layer structure. In the latter case, for example, the third magnetic film 13 may be so magnetized as shown in FIG. 3A, and individual component layers thereof may have such Curie points as those shown in FIG. 3B. An exemplary structure comprises a first component layer 131 having a Curie point Tc131 and composed of a first alloy of rare-earth and transition metals where the rare-earth sublattice magnetization is dominant at a temperature immediately below the Curie point Tc131, and a second component layer 132 having a Curie point Tc132 higher than Tc131 and composed of a second alloy of rare-earth and transition metals where the transition metal sublattice magnetization is dominant at a temperature immediately below the Curie point Tc131. And two or more of such component layers may be sequentially superposed as 131 - 132 - 131, or five of such layers may be disposed in a mutually adjacent and coupled state as shown in FIG. 3. In this structure, the respective saturation magnetizations of the first component layer 131 in a rare-earth sublattice magnetization dominant state and a second component layer 132 in a transition metal sublattice magnetization dominant state are oriented to be mutually opposite to each other as indicated by arrows Ms in FIGS. 4A and 4B where an arrow $M_{RE}$ denotes a rare-earth sublattice magnetization and an arrow $M_{TM}$ denotes a transition metal sublattice magnetization. Therefore, the magnetizations M131 and M132 of the layers 131 and 132 are alternately inverted as indicated by the arrows in FIG. 3A. Consequently the stray magnetic field can be diminished to zero or minimized to an extremely small intensity. And during the irradiation of a laser beam, the second component layer 132 is formed into a magnetically thin single layer due to the difference between the Curie points, whereby the external magnetic field required in a recording or erasing operation can be reduced as well.

In the magneto-optical recording medium of the present invention, as mentioned hereinabove, data is recorded initially on the third magnetic film 13 whose Curie point Tc3 is settable to a low temperature although being higher than the Curie point Tc2 of the second magnetic film 12. And in the recording mode, the operation is performed at a temperature in the vicinity of the Curie point Tc3 were the saturation magnetization is sufficiently low, so that the recording becomes possible with a small amount of energy as the stray magnetic field and the demagnetizing field derived therefrom are small in intensity. Consequently, the external magnetic field to be applicable in the recording or erasing operation can be decreased to a fraction of the known value. And such reduction of the required external magnetic field intensity in the recording or erasing operation enables magnetic field modulation type overwrite.

Furthermore, in the data-written magneto-optical recording medium S where the first magnetic film 11 is composed of a suitable material for providing a large rotation angle, such as Kerr rotation angle $\theta k$, of the plane of polarization by the magneto-optical interaction, the data can be read out with the first magnetic film 11 serving as a reproducing film to eventually enhance the reproduction output, hence shortening the data bit length to accomplish a higher recording density.

I claim as my invention:

1. A magneto-optical recording medium comprising a substrate, a first magnetic film, a second magnetic film and a third magnetic film sequentially formed on said substrate, said first magnetic film having a larger rotation angle of a plane of polarization than said third magnetic film, respective Curie temperature Tc1, Tc2, Tc3 of said first, second, and third magnetic films satisfying the relationhship with respect to room temperature $T_{RT}$, $Tc2 > T_{RT}$, and $Tc2 < Tc1$, $Tc2 < Tc3$, and said second magnetic film magnetically coupling said first and third magnetic films and interrupting said magnetic coupling between said first and third magnetic films at a recording temperature higher than Tc2.

2. A magneto-optical recording medium according to claim 1, magnetization Ms1, coercive force Hc1, thickness h1 of said first magnetic film are selected to satisfy the relation, $$\sigma w > 2Ms1.h1.Hc1 + 2Ms1.h1. \text{Hex}$$

wherein $\sigma w$ is an interface magnetic wall energy between said first and third magnetic films, and Hex is an external magnetic field applied upon recording data on said medium.

3. A magneto-optical recording medium according to claim 1 said first magnetic film is formed of amorphous GdFeCo alloys.

4. A magneto-optical recording medium according to claim 1, said third magnetic film is formed of multi-layer structure of rare earth rich alloy layer and transition metal rich alloy layer.

* * * * *